United States Patent
Gassen et al.

(10) Patent No.: US 6,576,687 B1
(45) Date of Patent: Jun. 10, 2003

(54) WET-STRENGTH AGENT WITH LOW DCP CONTENT

(75) Inventors: Karl-Rudolf Gassen, Ratingen (DE); Joachim König, Odenthal (DE); Karlheinrich Meisel, Odenthal (DE); Fritz Puchner, Köln (DE); Jürgen Reiners, Leverkusen (DE); Horst Zwick, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/869,716

(22) PCT Filed: Jul. 2, 2001

(86) PCT No.: PCT/EP99/00015

§ 371 (c)(1),
(2), (4) Date: Jul. 2, 2001

(87) PCT Pub. No.: WO00/40639

PCT Pub. Date: Jul. 13, 2000

(51) Int. Cl.$^7$ ................................................. C08K 3/24
(52) U.S. Cl. ...................... 523/404; 524/800; 524/845; 525/430; 528/341; 528/408; 528/422
(58) Field of Search .................... 524/800, 845; 525/430; 528/341, 408, 422; 523/404

(56) References Cited

U.S. PATENT DOCUMENTS

| | | | |
|---|---|---|---|
| 4,737,576 A | 4/1988 | Bachem et al. | 528/405 |
| 4,853,431 A | 8/1989 | Miller | 524/608 |
| 4,857,586 A | 8/1989 | Bachem et al. | 524/845 |
| 4,975,499 A | 12/1990 | Bachem et al. | 525/430 |
| 5,017,642 A | 5/1991 | Hasegawa et al. | 524/608 |
| 5,019,606 A | 5/1991 | Marten et al. | 523/414 |
| 5,171,795 A | 12/1992 | Miller et al. | 525/430 |
| 5,239,047 A | 8/1993 | Devore et al. | 528/339.3 |
| 5,364,927 A | 11/1994 | Devore et al. | 528/339.3 |
| 5,434,222 A | 7/1995 | Reiners et al. | 525/432 |
| 5,516,885 A | 5/1996 | Gorzynski | 528/482 |
| 5,614,597 A | 3/1997 | Bower | 525/430 |
| 5,686,028 A | 11/1997 | Meynckens et al. | 264/30 |
| 5,714,552 A | 2/1998 | Bower | 525/420 |
| 5,718,804 A | 2/1998 | Jansen et al. | 162/164.6 |
| 5,739,249 A | 4/1998 | Reiners et al. | 528/44 |
| 5,846,383 A | 12/1998 | Träubel et al. | 162/164.6 |
| 5,866,049 A | 2/1999 | Meynckens et al. | 264/30 |
| 6,022,449 A | 2/2000 | Jansen et al. | 162/135 |
| 6,080,831 A | 6/2000 | Jansen et al. | 528/65 |

FOREIGN PATENT DOCUMENTS

| | | | |
|---|---|---|---|
| DE | 19728789 | * | 1/1999 |
| EP | 0 776 923 | | 6/1997 |
| EP | 0 512 423 | | 7/1998 |

* cited by examiner

Primary Examiner—Margaret G. Moore
Assistant Examiner—D. Aylward
(74) Attorney, Agent, or Firm—Godfried R. Akorli; Richard E. L. Henderson

(57) ABSTRACT

The invention relates to a novel process for the preparation of polycondensate solutions based on polyamidoamine/epichlorohydrin resins that gives products having a very low content of organic chlorine compounds, in particular a 1,3-dichlorophenol-2-propanol content of <0.1%, in combination with high activity and good shelf-life.

10 Claims, No Drawings

WET-STRENGTH AGENT WITH LOW DCP CONTENT

The present invention relates to a novel process for the preparation of polycondensate solutions based on polyamidoamine/epichlorohydrin resins having a 1,3-dichloro-2-propanol content of <0.1%.

Reaction products of polyamidoamines and/or polyamines with epichlorohydrin have long been used for imparting wet strength to paper.

The products contain organic chlorine compounds, some of which are polymer-bound while the others consist of low molecular weight secondary components which are formed by undesired secondary reactions of the epichlorohydrin with water and chloride ions, preferably in the acidic range, e.g. 1,3-dichloro-2-propanol (DCP) and 1-chloro-2,3-propanediol (CPD).

These low molecular weight components, some of which are adsorbed only slightly by the cellulose fibers in the production of papers having wet strength, finally enter the wastewater of the paper mill, where they are detected as AOX (adsorbable organic halogen content) (DIN 38409). In recent years, the authorities have imposed taxes according to the AOX emissions and have also set limits for the AOX pollution of the wastewater which are to be complied with, so that a reduction of the AOX pollution was required for epichlorohydrin resins as a source of the AOX pollution.

A large number of proposed solutions for reducing the organic chlorine content of the polycondensates are already known.

Thus, for example, an aftertreatment of the polycondensate with a base is carried out in the European Patent Applications EP-A 282 862 and EP-A 332 967 and with an inorganic base and an organic mono- or polyamine or with ammonia in EP-A 512 423.

EP-A 0 349 935 describes polycondensates which contain polyamines and alkanolamines as amine component and which are likewise subjected to a base aftertreatment for reducing the organic chlorine content.

In these processes, it is true that the organic chlorine content is substantially reduced. However, they are all very complicated since a repeated change in the pH is required and in all cases the final addition of acid is required, which is intended to stabilize the polycondensate in the acidic pH range. The result is a relatively high electrolyte content of the commercial product, which adversely affects the shelf-life and can cause corrosion problems during use. If it is necessary to impart sufficiently high wet strength to paper, it is moreover necessary in this process to use relatively large amounts of ≧1.0 mole of epichlorohydrin per base nitrogen. Although it is possible also to employ smaller amounts of epichlorohydrin, a substantial loss of the wet strength activity must then be accepted.

Since products having a high DCP content may constitute a health risk, labeling of commercial products based on epichlorohydrin resins was demanded in Germany when the DCP content exceeds a value of 0.1%. For this reason, the manufacturers of wet strength agents based on epichlorohydrin had to make considerable additional effort to fall below these limits, to avoid the levies and to formulate the product to be toxicologically safe.

EP 469 891 describes, for example, a process for the reaction of polyamidoamine with epichlorohydrin at temperatures of not more than 60° C. to a conversion of 70–100%, addition of an acid and further reaction, a reduction of the organically bound chlorine by at least 10% being achieved. Here, the acid is added during the condensation itself and has the function of reducing the rate of the condensation in the final stage.

Furthermore, processes are known (cf. for example EP-A 488 767, EP-A 717 146, EP-A 374 938, U.S. Pat. No. 5 239 047 and U.S. Pat. No. 5 364 927) which aim at reducing the content of organic chlorine and DCP in the polycondensate by a special reaction procedure and a reduction in the molar amount of epichlorohydrin used per mole of base nitrogen.

EP-A 540 943 describes a process for the preparation of polycondensates by reacting polyamidoamine and/or polyamine with epichlorohydrin, an inert gas being passed through the reaction mixture before and optionally also during the partial crosslinking.

EP-A 320 121 describes a process for the stabilization of aqueous, at least 15% strength solutions of a polyamide/epichlorohydrin resin to gelling and viscosity reduction, an aqueous mixture of a weak and a strong acid being added to said resin solution in amounts of from 0.6 to 1.2 mmol of protons per g of solid resin. The molar ratio of the weak acid to the strong acid is from 0.5 to 10, preferably from 2.0 to 4.0 and particularly preferably from 3.0 to 3.1 (relative to protons). In this process the pH is generally brought to from 3 to 4.2, preferably to from 3.2 to 3.4. This process is preferably applied to resins which are prepared by an addition reaction of from 1.0 to 1.7 mol of epichlorohydrin per secondary amino-N of the polyamide at temperatures of from 45 to 70° C. In the case of smaller amounts of epichlorohydrin, a loss of activity is to be expected; in the case of a larger amount of epichlorohydrin, stability problems are envisaged. No information is given about the content of DCP.

As shown by the large number of citations mentioned as prior art, various experiments were carried out in the past to formulate optimum polyamidoamine/epichlorohydrin resins. The desired parameters of satisfactory ecological behavior through a low content of organic chlorine compounds (AOX, DCP, CPD), high wet strength and good shelf-life in combination with an economically advantageous preparation process without complicated additional steps could not be simultaneously achieved since some of them require contradictory measures in the preparation process.

In many cases, in particular an adequate shelf-life also remained a problem which usually manifested itself after a short storage time, depending on the preparation process and on the formulation as well as on the storage conditions, in an undesirable change in the physical data, for example in an increase in the pH, an increase or decrease in the viscosity, increasing discoloration and a loss of activity.

Thus, it was furthermore the object to provide an improved simple process for the preparation of polycondensate solutions having a very low content of organic chlorine compounds, in particular of 1,3-dichloro-2-propanol, high wet strength activity and a good shelf-life.

The process according to the invention achieves this object by permitting the preparation of polycondensate solutions based on polyamidoamine/epichlorohydrin resins having a very low content of organic chlorine compounds, in particular of 1,3-dichloro-2-propanol, in particular a content of 1,3-dichloro-2-propanol of <0.1%, high activity and a good shelf-life. The present process for the preparation of polycondensate solutions is characterized by a) reaction of a1) at least one basic polyamidoamine and/or at least one polyamine in the form of a 10-50% strength solution with a2) epichlorohydrin at 10–25° C., the molar ratio of epichlorohydrin to base-N in a1) being from 0.5 to 0.85;

b) subsequent further reaction at 10–25° C. to an epichlorohydrin conversion of not more than 90–99%;

c) subsequent reaction of the product from b) with further solution a1) for completion of the epichlorohydrin conversion in a molar ratio of the base-N contained in solution a1) to epichlorohydrin of from 1:1 to 1.2:1, the pH being kept above 6;

d) heating to 30–70° C. until the viscosity of a 15% strength solution is 30–100 mPas at 25° C., and e) reaction of the product from d) with formic acid and/or sulfuric acid, the pH being brought to from 2.0 to 3.0.

The process according to the invention is distinguished by technically simple conditions and requires no complicated additional steps, like many of the processes described above. Surprisingly, the polycondensates prepared by this process nevertheless have both a very low DCP content of <0.1% and a wet strength activity improved compared with known processes, as well as an improved shelf-life.

The polyamidoamine stated under a1) is prepared by reacting an aliphatic dicarboxylic acid with a polyalkylenepolyamine in a molar ratio of from 1.0:1 to 1:1.2.

Polyalkylenepolyamines which contain at least two amino groups capable of amide formation and at least one further secondary or tertiary amino group are suitable. Particularly suitable polyamines are diethylenetriamine, triethylenetetramine, tetraethylenepentamine, pentaethylenehexamine, etc. and N-methyl-bis-(aminopropyl)amine, bis-hexamethylenetriamine, N-aminoethylpiperazine or bis-aminoethylpiperazine. In addition, diamines, such as ethylenediamine, diaminopropane and 1,6-diaminohexane may also be concomitantly used in a small amount. A particularly preferred polyalkylenepolyamine is diethylenetriamine.

Saturated dicarboxylic acids having 2 to 12 C atoms or their functional derivatives, such as anhydrides, esters or monoesters, are suitable as the aliphatic dicarboxylic acid. Examples are malonic acid, succinic acid, glutaric acid, adipic acid and sebacic acid, their dimethyl or diethyl esters and also corresponding mixtures. Adipic acid is particularly preferred. The concomitant use of (o-aminocarboxylic acids containing 3–6 C atoms, such as aminocaproic acid, or their lactams, such as, for example, ε-caprolactam, is also possible.

The reaction of the aliphatic dicarboxylic acid with polyalkylenepolyamine to give a polyamidoamine is carried out in a molar ratio of from 1:1.0 to 1:1.2 at temperatures of 120–200° C. while distilling off water (melt polymerization). Usually, the mixture of said components is first heated to temperatures between 100 and 150° C. The low-viscosity melt obtained is slowly heated to not more than 200° C. after not more than 3 hours at atmospheric pressure, the resulting water of reaction being distilled off. The process can also be carried out under pressure.

In order to avoid discolorations of the reaction product, it is expedient to effect condensation in the absence of oxygen. Distillation is continued until at least 98% of the theoretical amount of water have been removed, i.e. 1 mol of water per mol of carboxyl group of the dicarboxylic acid.

After the end of the melt polycondensation, dilution to a solids content of from 20 to 60%, preferably 40–55%, is effected by adding water, since the polyamidoamines can be stored and further processed more easily in this dilute form. The viscosity of a 50% strength solution should be from 200 to 800 nPas at 25° C. The base equivalent weight of a 50% strength solution of a polyamidoamine a1) suitable for the process according to the invention, determined by titration by known methods, is preferably 300–500 g/eq.

The basic polyamidoamines described above can be used in an individual mixture or in any desired mixture with one another or in any desired mixture with polyamines according to a1). Suitable polyamines are compounds of the formula (I)

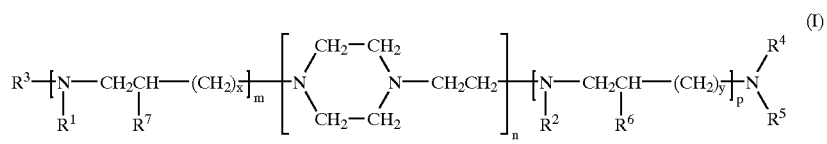

in which x and y independently of one another represent 0 or 1 m and p independently of one another represent from 0 to 5

$R^6$ and $R^7$ independently of one another represent H or methyl n represents from 0 to 5, $R^1$, $R^2$ and $R^3$ independently of one another represent H, methyl, ethyl, hydroxyethyl, hydroxypropyl or a radical of the formula (II)

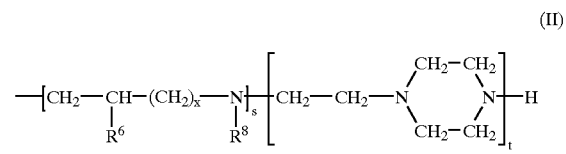

wherein $R^8$ represents H, methyl or ethyl, $R^6$ and x have the abovementioned meaning and s and t independently of one another represent from 0 to 3, and $R^5$ and $R^4$ independently of one another represent H, methyl, ethyl, hydroxyethyl, hydroxypropyl, but at least one radical $R^4$ or $R^5$ represents H, or $R^4$ and $R^5$ together represent a group of the formula —$CH_2CH_2NHCH_2CH_2$—, and, where m, n and p represent zero, at least one of the substituents $R^3$, $R^4$ and $R^5$ is different from hydrogen.

Examples of particularly preferred polyamines of the formula (I) are: diethylenetriamine, triethylenetetramine, tetraethylenepentamine, pentaethylenehexamine, hexaethyleneheptamine, dipropylenetriamine, dihexamethylenetriamine, N-methyl-bis(3-aminopropyl) amine, tris(2-aminoethyl)amine, piperazine, bis (piperazinyl)ethane, N-(2-aminoethyl)-piperazine, bisaminoethylpiperazine, bisaminopropylpiperazine.

Of course, polyamine mixtures may also be used instead of the pure polyamines.

The use of a pure polyamidoamine obtained from adipic acid and diethylenetriamine is particularly preferred. The metering of the epichlorohydrin is effected in 0.5–5 hours at temperatures of 10–25° C., preferably continuously for better control of the exothermic addition reaction, optionally also discontinuously or batchwise.

The further reaction of the epichlorohydrin is then effected in stage b) within 4–10 hours at 10–25° C. until an epichlorohydrin conversion of 90–99%, preferably 95–99%, is reached. At higher temperatures, undesired byproducts, such as DCP and CPD, form to an increasing extent. At lower temperatures, the speed of the addition reaction of the epichlorohydrin with the polyamidoamine is too low so that uneconomically long reaction times are required and the desired epichlorohydrin conversion is not reached.

Batch reactors have proved useful as reactors for the addition reaction of the epichlorohydrin with the polyamidoamine in stages a) and b). Alternatively, continuous apparatuses, such as multistage reactors and tubular reactors, may also be used for optimum utilization of the epichlorohydrin, for avoiding back-mixing and for good heat removal and temperature control.

The product obtained in stage b) is then reacted in stage c) with further solution a1) for reaction of the remaining, unconverted epichlorohydrin a2) amounting to not more than 10%, preferably 1–5%, of the amount of epichlorohydrin a2) used, the molar ratio of the base-N contained in solution a1) to epichlorohydrin a2) being from 1:1 to 1.2:1. In this reaction, the pH is kept above 6, preferably above 7, with the result that undesired secondary reactions are suppressed. As a result of this measure, the reaction time is shortened and the content of organically bound chlorine and DCP and CPD is further reduced. Optionally, the further addition of solution a1) may also be effected at the beginning of the heating phase of the following stage d). However, the addition before the heating stage is more advantageous.

In stage d), the product obtained, optionally after dilution with water to 10–25%, is heated to temperatures of from 30 to 70° C., preferably 50–60° C., and kept at this temperature for from 2 to 6 hours. The condensation or partial crosslinking of the reaction product formed as an intermediate takes place here and is carried out until the viscosity of a 15% strength solution is from 30 to 100 mPas at 25° C. At a lower viscosity, a loss of wet strength activity is to be expected; at higher viscosity, the handling, for example pumpability and meterability of the product, becomes more difficult and the shelf-life is reduced because premature swelling is possible, making the product unusable.

After the desired final viscosity from 30 to 100 mPas has been reached in stage d), the product is reacted in stage e) with formic acid and/or sulfuric acid, the pH being brought to from 2.0 to 3.0. The further crosslinking is stopped and the product is stabilized to a further viscosity increase. The concomitant use of further acids, such as nitric acid, phosphoric acid, acetic acid or also acetic anhydride, propionic acid, citric acid, phosphonobutanetricarboxylic acid, malonic acid, tartaric acid, adipic acid, glutaric acid, etc., is possible. The use of halogen-containing acids, such as hydrochloric acid, is less preferred. A combination of sulfuric acid and formic acid is preferably used and can be added as a mixture or in succession in any desired order. Better constancy of the viscosity and of the pH is achieved in particular by using formic acid, so that the shelf-life of the commercial product is decisively improved.

Since the pH is to be regarded as a target parameter, it is not possible to establish the amounts of acid exactly. For example, amounts of from 0.3 to 6 mol of acid (calculated relative to proton content) per kg of solid resin are however usual. From 0.5 to 3 mol of acid, relative to solid resin, are preferably used.

The molar ratio of formic acid to sulfuric acid (relative to proton content) may be brought to any desired values between 0.2 and 10. A molar ratio of from 1.0 to 2.5 is preferred.

The pH is brought to from 2.0 to 3.0, preferably to from 2.4 to 2.9, by adding the abovementioned acids. Lower pH values lead to a decrease in the viscosity with loss of activity after a relatively long storage time. At a pH above 3.0, an increase in the viscosity, possibly up to swelling of the product, is to be expected, so that a desired shelf-life of from 3 to 6 months cannot reliably be reached.

If required, the solids concentration is brought with water to the desired final concentration of, for example, from 10 to 30%, preferably from 12 to 20%, simultaneously with, before or after the acid addition in stage e).

In order to lighten the hue of the polycondensate solution prepared according to the invention and to avoid the undesired further discoloration occurring under unfavorable storage conditions, it is advantageous to add small amounts of a reducing sulfur compound to the polycondensate solution after the end of stage e). In particular, sodium disulfite, sodium bisulfite, sodium dithionite and sodium formaldehyde sulfoxylate are suitable. As a rule, it is sufficient to use amounts of from 0.0005 to 0.05%, relative to the polycondensate solution, for good stabilization of the hue. For example, the iodine color number (DIN 53995) is suitable for determining the hue.

Preferably, the pH is adjusted again to a pH of from 2.0 to 3.0, preferably from 2.4 to 2.9, with sulfuric acid and/or formic acid after a maturing time of from 4 to 48 hours after the first formulation, with the result that a further improvement in the shelf-life can be achieved. Particularly with the use of formic acid, this maturing time can be shortened to, preferably, from 4 to 18 hours, so that storage capacity can be saved and the product can be delivered earlier without there being any danger of swelling and premature crosslinking. Suitable amounts of acid for this pH adjustment are from 0.001 to 0.2 mol of sulfuric acid and/or formic acid per kg of solid resin (calculated as proton content).

The products prepared by the process according to the invention have an average molecular weight ($M_w$) of at least 1 000, preferably from 2 000 to 1 000 000 g/mol.

The polycondensate solution is free of inorganic salts since no inorganic bases are used for reducing the organic chlorine content.

By means of the process according to the invention, the epichlorohydrin used is optimally utilized for the addition reaction with the polyamidoamine with only a low level of secondary reactions, so that undesired secondary components, such as DCP and CPD, are formed only in minor amounts and, in spite of the use of relatively little epichlorohydrin, high wet strength activity is achieved.

The polycondensate solutions prepared according to the invention are used as paper assistants, especially for treating paper, board and cardboard to impart wet strength. The treatment is effected in a manner known per se by adding the aqueous solution of the polycondensate to a suspension of the fiber raw material, which, in addition to cellulose or groundwood, may contain, for example, fillers, further paper assistants, such as retention aids, sizes, fixing compositions, chlorine-free wet strength agents, such as polyisocyanates, dyes, optical brighteners, etc. Paper is formed therefrom by drainage, either in the laboratory on a sheet former, for example Rapid-Köthen, or on the industrial scale on a paper machine. The amounts used depend on the desired wet strength effect. As a rule, it is suitable to use amounts of from 0.01 to 2.5% by weight, preferably from 0.1 to 1.5% by weight, of solid resin, relative to dry fiber.

Preferably a combination of the polycondensates prepared according to the invention and chlorine-free hydrophilized polyisocyanates, as described, for example, in the German Offenlegungsschriften (German Published Specifications) DE-A 4 211 480, DE-A 4 226 110, DE-A 4 436 058, DE-A 4 446 334, DE-A 1 951 6405 and German Patent Application No. 1 952 0092.6, since, with this combination, particularly good effects are achieved in the case of the filler retention and wet strength of paper through a synergy of the two components and, particularly advantageously, charge control of the material system of the paper machine can be carried out, which is advantageous particularly in the production of decorative and laminated paper.

In addition, owing to their high cationic charge, the polycondensate solutions prepared according to the invention promote the drainage of the stock mixture on the paper machine and the retention of fillers, dyes, optical brighteners and other paper assistants, for example reactive and polymer sizes, resulting in many cases in higher efficiency of these assistants, such as increased depth of color or improved sizing effect.

Furthermore, the polycondensate solutions prepared according to the invention are suitable for converting any desired fillers and pigments into cation form, such as, for example, kaolin, clay, bentonite, calcium carbonate, talc or titanium dioxide, which are used in the paper industry but may also advantageously be used in other applications. It is preferable to convert into cationic form titanium dioxide, which is used as a white pigment in the production of decorative paper, where a high cationic charge in combination with a fine distribution of the white pigment is required in order to obtain high opacity. The polycondensate solutions prepared according to the invention are also suitable for converting into cationic form natural products, such as potato, maize or wheat starch, which can, for example, be enzymatically or oxidatively degraded, with the result that, for example, the intrinsic retention during use in the paper pulp can be improved, or for converting into cationic form cellulose powder which, after conversion to cationic form, can be used, for example, for improving the retention.

The use of the polycondensate solutions prepared according to the invention in the paper surface, for example together with starch, sizes, polyisocyanates and/or pigments, dyes and optical brighteners and further additives, in the size press or film press and also as crosslinking agents in the paper coat is also possible.

Owing to their rapid crosslinking during the drying of the paper web in the drying section of the paper machine, they result in good wet strength from the paper machine itself, which can be further increased by storage at room temperature or by treatment at elevated temperatures. The polycondensates prepared according to the invention do not influence the absorptivity of the paper, so that they can advantageously be used in the production of tissue and hygiene papers. Use in the production of decorative and laminated papers, where they result in good retention of titanium dioxide and other fillers in addition to a high wet strength effect and contribute toward high opacity, is also preferred. An advantage of the polycondensates prepared according to the invention is their easy reheatability during the processing of waste and recycled paper. For example, sodium hydroxide solution and/or peroxodisulfate are particularly suitable for the digestion.

The polycondensates can furthermore also be used as textile assistants for the treatment of natural and synthetic fiber materials. An important application form is textile printing, in which a print paste is prepared, for example, from a basic polyamidoamine, a polycondensate prepared according to the invention and optionally homo- or copolymers of vinyl compounds and further additives, the textile fiber is printed with this print paste on a printing unit and then condensation is effected at elevated temperature.

EXAMPLES

Example 1

Preparation of a Basic Polyamidoamine Solution 216.8 g (2.105 mol) of diethylenetriamine and 302 g of adipic acid (2.07 mol) are combined and are heated to 140° C. and stirred at this temperature for 1 hour. Thereafter, the temperature is slowly increased to 180° C. in the course of 2 hours and this temperature is maintained for a further hour until 75 g of water have been distilled off. A polyamidoamine solution is then obtained by careful addition of 450 g of water.
Solids content 50%
Viscosity 410 mPas (at 25° C.)
Base equivalent weight of the solution: 398 g/mol of base-N Preparation of Polycondensate solutions According to the Invention Example 2

212 g of the polyamidoamine solution (0.533 mol) from Example 1 and 212 g of water are introduced into a four-necked flask having a stirrer, thermometer condenser and pH electrode. At 15° C., 41.5 g (0.449 mol) of epichlorohydrin are uniformly added dropwise in the course of one hour and stirring is effected for 8 hours at 20° C. until an epichlorohydrin conversion, determined by gas chromatography, of 95% is reached. A further 8.9 g (0.022 mol) of the polyamidoamine solution from Example 1 are then added, the pH being kept at >7, heating to 55° C. is effected and this temperature is maintained for about 4 hours until the viscosity of a 15% strength solution has increased to 50–60 mPas at 25° C. Dilution is effected with 500 g of water to a solids concentration of about 15.5%, the reaction is stopped by adding 6.5 g of 48% strength sulfuric acid, and 5 g of formic acid (98% strength) are added, with the result that a pH of 2.7 is established. The solids content is then adjusted to 15% by adding about 50 g of water.
Solids content 15.0%
Viscosity 55 mPas at 25° C.
DCP content 0.065%
CPD content 0.05%

Example 3

398 g of the polyamidoamine solution from Example 1 (1 mol) and 398 g of water are introduced into a four-necked flask having a stirrer, thermometer condenser and pH electrode. At 15° C., 64.75 (0.7 mol) of epichlorohydrin are uniformly added dropwise in the course of one hour and stirring is effected for 8 hours at 20° C. until an epichlorohydrin conversion, determined by gas chromatography, of 96% is reached. A further 4.45 g (0.011 mol) of the polyamidoamine solution from Example 1 are then added, the pH being kept at >7, heating to 55° C. is effected and this temperature is maintained for about 4 hours until the viscosity of a 15% strength solution has increased to 65–70 mPas at 25° C.

Dilution is effected with 900 g of water to a solids concentration of about 15.5%, the reaction is stopped by adding 14 g of 48% strength sulfuric acid, and 10 g of formic acid (98% strength) are added, with the result that a pH of 2.7 is established. The solids content is then adjusted to 15% by adding about 90 g of water.
Solids content 15.0%
Viscosity 66 mPas at 25° C.
DCP content 0.034%
CPD content 0.035%

Example 4

Continuous/4-vessel Cascade

For this experiment, a 4-vessel cascade which consists of two reactors having a capacity of 100 cm³ each and a further reactor having a volume of 2 l are used. The first 3 vessels are flooded and the 4th reactor is operated with a gas cushion. All reactors are first kept at 20° C.

400 g of the polyamidoamine solution from Example 1), 400 g of water and 92.5 g of epichlorohydrin are pumped at 20° C. simultaneously in the course of 9 hours into the first reactor of the 3-vessel cascade (average residence time 1 h). The overflow from the first reactor is pumped to the second reactor and then into the third reactor and is collected in the fourth reactor.

When the total amount of polycondensate solution has been transferred to the fourth reactor, stirring is continued for a further 2.5 hours at 20° C. and simultaneously the pH is kept constant at 7.0 to 7.2 by continuously adding about 16.5 g of the polyamidoamine solution from Example 1.

Thereafter, the fourth reactor is heated to 55° C. and stirring is continued for about a further 4 hours until the viscosity, relative to a 15% strength solution at 25° C., has increased to 50–60 mPas.

Dilution with 930 g of water to a solids concentration of 15.5% is effected and the condensation is stopped by adding 12 g of sulfuric acid (48% strength) and 9 g of formic acid, with the result that the pH is adjusted to 2.7. The solids content is then adjusted to 15% by adding about 90 g of water.
Solids content 15.0%
Viscosity 60 mPas at 25° C.
DCP content 0.073%
CPD content 0.04%

Comparative Examples

Example 5

200 g (0.502 mol) of the polyamidoamine solution from Example 1 are diluted with 260 g of water. 39.5 g (0.427 mol) of epichlorohydrin are then metered in continuously in the course of 30 minutes at 25° C. The solution obtained is kept at 28° C. for 3 hours and then heated to 50° C. After 70 minutes, 165 g of water are added, stirring is effected for a further 13 min at 50° C. and acidification to pH 2.8 is then effected with 13 g of a 48% strength sulfuric acid.
Solids content 15.0%
Viscosity 75 mPas at 25° C.
DCP content 0.092%
CPD content 0.074%

It is true that the DCP content in this experiment is below the compulsory labeling limit of 0.1%. As is evident from table 1, the averaged wet breaking load is however only 80% of the wet strength as can be obtained using the polycondensate solution obtained from Example 2. If high wet strengths in combination with high filler concentrations are required, as, for example, in the area of decorative papers, the polycondensate solution is therefore unsatisfactory in its activity.

Example 6

Example 5 is repeated using a larger amount of 44.0 g (0.475 mol) of epichlorohydrin. The polycondensate solution obtained has the following analytical data:
Solids content 15.0%
Viscosity 60 mPas at 25° C.
DCP content 0.24%
CPD content 0. 12%

In this example, it is true that a wet strength which almost corresponds to the polycondensate solution obtained in Example 2 is reached. However, the DCP content is so high that labeling of the polycondensation solution is required and handling of said solution is possible only under restricted safety conditions.

Use Examples

Example 7

Bleached chemical pulp (pine/birch sulfate in the weight ratio 80:20) is beaten in a Hollander to a freeness of 38° Schopper-Riegler at a stock density of 2.5%. 100 g of the chemical pulp suspension obtained are introduced into a beaker and diluted to 1 000 ml with water.

Thereafter, the amounts, stated in table 1, of the polycondensate solutions prepared according to the examples (% by weight of form used, relative to chemical pulp) are added to the fiber and stirred for 3 min.

The content of the beakers is then poured onto a sheet former (Rapid-Köthen apparatus) and diluted with 8 l of water, and paper sheets having a basis weight of about 80 g/m² (according to DIN 54358, Part 1) are formed. The paper sheets are dried for 8 minutes at 85° C. in vacuo at 60 mbar and are further heated for 10 minutes at 110° C. in a drying oven.

After conditioning, 5 test strips having a width of 1.5 cm are cut from each paper sheet and soaked in demineralized water for 5 minutes. The wet strips are then immediately tested in a tensile tester (DIN 53112, Part 2) with respect to their wet breaking load. The results obtained are listed in table 1.

|  | Wet breaking load (N) | | | Rel. wet breaking |
| --- | --- | --- | --- | --- |
| Use, rel. to pulp | 2% | 4% | 6% | load |
| Example 2 | 11.6 | 16.7 | 20.7 | 100% |
| Example 3 | 10.1 | 14.8 | 18.0 | 87.6% |
| Example 4 | 11.3 | 16.8 | 21.4 | 101.0% |
| Example 5 (comparison) | 9.8 | 13.1 | 16.4 | 80.2% |
| Example 6 (comparison) | 11.5 | 16.5 | 19.9 | 97.7% |

What is claimed is:
1. A process for the preparation of polycondensate solutions having a 1,3-dichloro-2-propanol content of less than 0.1% comprising
   (a) reacting
      (a1) at least one basic polyamidoamine and/or at least one polyamine in the form of a 10–50% strength solution with
      (a2) epichlorohydrin at 10–25° C. at a molar ratio of epichlorohydrin to base-N in component (a1) of from 0.5 to 0.85;
   (b) reacting the mixture from stage (a) at 10 to 25° C. to an epichlorohydrin conversion of not more than 90 to 99%;

(c) reacting the product from stage (b) with additional solution (a1), while maintaining a pH above 6, at a molar ratio of the base-N contained in solution (a1) to epichlorohydrin of from 1:1 to 1.2:1 to complete the epichlorohydrin conversion;

(d) heating the product from stage (c) to 30 to 70° C. until the viscosity of a 15% strength solution is 30 to 100 mPas at 25° C., and (e) reacting the product from stage (d) with formic acid and/or sulfuric acid, the pH being brought to from 2.0 to 3.0.

2. A process according to claim 1 wherein in stage (a) the epichlorohydrin (a2) is metered in continuously during a period of 0.5 to 5 hours.

3. A process according to claim 1 wherein stage (b) is carried out to an epichlorohydrin conversion of 95 to 99%.

4. A process according to claim 1 wherein stages (a) to (e) are carried out in a batch reactor or in a continuous apparatus.

5. A process according to claim 1 wherein in stage (c) the pH is kept above 7.

6. A process according to claim 1 wherein the heating in stage (d) is to 50 to 60° C.

7. A process according to claim 1 wherein in stage (e) sulfuric acid and formic acid are used either as a mixture or in succession in any desired order at a molar ratio of formic acid to sulfuric acid, relative to proton content, of from 1.0 to 2.5.

8. A process according to claim 1 wherein in stage (e) the solids concentration is adjusted with water to a desired final concentration simultaneously with, before, or after addition of acid.

9. A process according to claim 8 wherein the solids concentration is adjusted with water to 10 to 30%.

10. A process according to claim 1 wherein after stage (e), a sulfur compound having a reducing action is added in an amount of 0.0005 to 0.5%, relative to the polycondensate solution.

* * * * *